(No Model.)

A. A. LYLE.
DISH DRAINER.

No. 497,673. Patented May 16, 1893.

Witnesses.

Inventor
Alice A. Lyle.
By James L. Norris
Atty.

UNITED STATES PATENT OFFICE.

ALICE A. LYLE, OF KINZUA, PENNSYLVANIA.

DISH-DRAINER.

SPECIFICATION forming part of Letters Patent No. 497,673, dated May 16, 1893.

Application filed February 2, 1893. Serial No. 460,693. (No model.)

*To all whom it may concern:*

Be it known that I, ALICE A. LYLE, a citizen of the United States, residing at Kinzua, in the county of Warren and State of Pennsylvania, have invented new and useful Improvements in Dish Washers and Drainers, of which the following is a specification.

This invention relates to dish washers and drainers and has for its object to provide a simple, inexpensive and convenient appliance whereby dishes can be readily drained or rinsed and in which they may, if desired, be left to dry after the water has been drawn off.

This invention consists in a dish washer or drainer having the peculiarities of construction hereinafter more particularly described.

Figure 1:
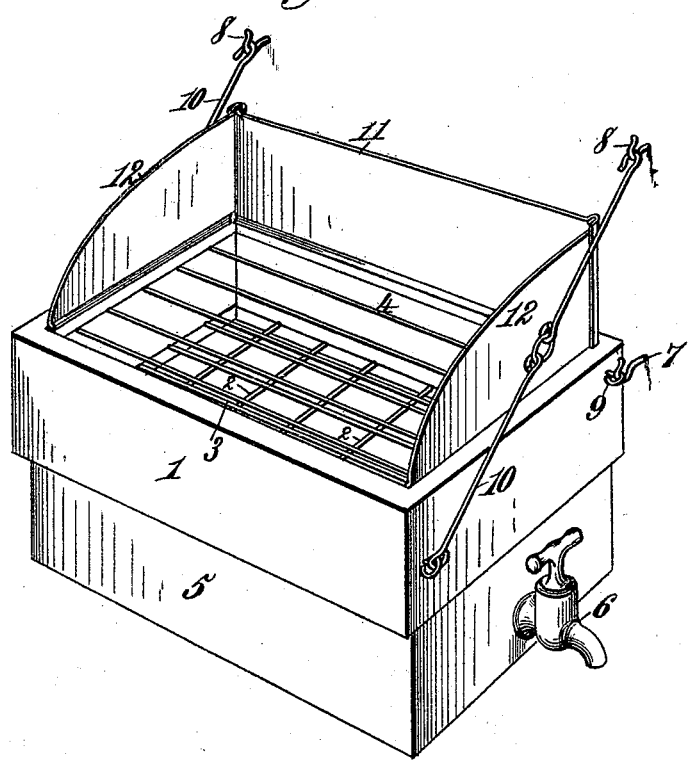
Figure 2:
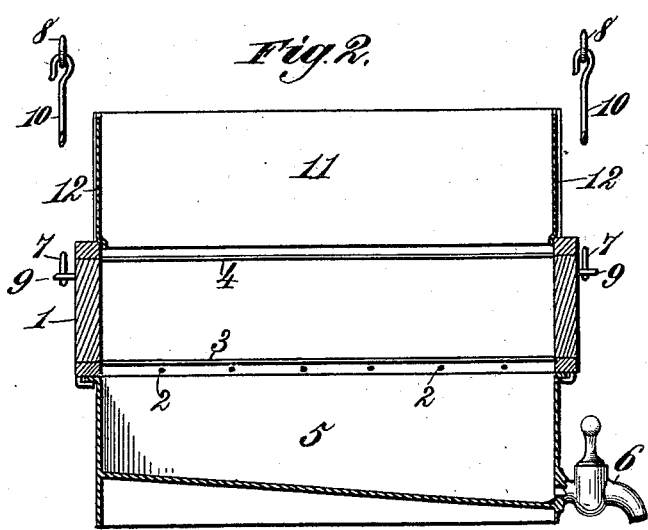

In the annexed drawings—Figure 1 is a perspective representing my improved dish washer and drainer suspended against a wall. Fig. 2 is a vertical longitudinal section of the dish washer and drainer.

Referring to the drawings, the numeral 1 designates a frame, preferably of rectangular form and composed of wood. The frame 1 is open at top and bottom. In the bottom of the frame 1 is secured a series of transversely arranged rods or wires 2 and above these are secured upper and lower series of longitudinally arranged rods or wires 3 and 4. The transversely arranged wires 2 are sufficiently close together to serve as a support for the dishes to be rinsed or drained the said dishes being placed in a vertical position between the longitudinally arranged wires 3 and 4 that serve as lateral supports to retain the dishes in place. To the under side of the frame 1 is secured a rectangular metal pan 5 to receive the water to be poured over the dishes. This pan is preferably made of tin. In one end of the pan 5 is inserted a faucet 6 through which the water can be drawn off. The pan 5 may be detachably connected to the frame 1 so that the pan can be readily disconnected for the purpose of cleansing it, when required.

This dish washing apparatus may be readily arranged for use by simply standing it on a table or other support. After the dishes have been placed in the drainer, water may be poured over them and be subsequently drawn off through the faucet. Frequently, however, it is desirable to suspend the dish washer and drainer against a wall or other vertical support. For this purpose the wall may have hooks 7 and 8 inserted therein at suitable points. To the ends of the frame 1, near its rear, are attached screw-eyes 9 adapted to engage the lower hooks 7; and to the forward portions of the frame ends are attached jointed rods or flexible connections 10 that are adapted to be engaged with the upper hooks 8 on the wall. By means of these devices the dish washer and drainer can be readily suspended in a convenient position for use.

In order to prevent any liability of splashing or splattering of water an oblong guard plate 11, of tin or other suitable material, may be supported on the rear edge of the frame 1, against the wall; and other tin guard plates 12 may be arranged at right angles to the ends of the plate 11, along the ends of the drainer frame.

From the foregoing description the operation and advantages of this dish washing and draining apparatus will be readily understood.

When the apparatus is not in use the guards 11 and 12 may be taken down and the frame 1 and attached pan 5 may be folded up and secured against the wall by means of a hook.

What I claim as my invention is—

A dish-washer and drainer, consisting of a rectangular frame 1 having an upper set of rods 4, and a lower set of rods 2 and 3, a pan 5 detachably secured to the lower edge of the frame and having a faucet 6, the rear guard 11, and the end guards 12 surmounting the upper edge of the frame, and rods 10 secured to the ends of the frame and adapted to engage eyes on a wall or support for sustaining the frame in a horizontal plane, substantially as described.

In testimony whereof I have hereunto set my hand and affixed my seal in presence of two subscribing witnesses.

ALICE A. LYLE. [L. S.]

Witnesses:
J. W. GREEN,
A. W. BRINK.